J. UNDERWOOD.
Machine for Cutting Teeth of Wheels.

No. 70,293.

Patented Oct. 29, 1867.

Witnesses:
Jno. D. Patten.
Thos. J. Chamberlain.

Inventor:
John Underwood
By atty A.B. Stoughton.

United States Patent Office.

JOHN UNDERWOOD, OF MUSCATINE, IOWA, ASSIGNOR TO EPHRAIM BALL, OF CANTON, OHIO.

Letters Patent No. 70,293, dated October 29, 1867.

IMPROVED MACHINE FOR CUTTING TEETH OF WHEELS.

*The Schedule referred to in these Letters Patent and making part of the same.*

TO ALL WHOM IT MAY CONCERN:

Be it known that I, JOHN UNDERWOOD, of Muscatine, in the county of Muscatine, and State of Iowa, have invented certain new and useful Improvements in Cutting Internal Gears in a Lathe or Engine; and I do hereby declare the following to be a full, clear, and exact description of the same, reference being had to the accompanying drawings, making a part of this specification, in which—

Similar letters of reference where they occur in the separate figures denote like parts of the machine in both of the drawings.

Internal gears having a wall or head, to which the rim or flange in which the cogs or teeth are formed is attached, have not heretofore been cut in lathes or engines, from the fact that there was no clearance for the cutting tool at the backs of the cogs. I have devised a means of cutting such gears in a lathe or engine, which not only expedites the operation, but makes a much more perfect gear than can be made by casting and hand-dressing, and consequently runs more true, and with much less liability of friction, wearing, or chafing; and my invention consists in the manner of feeding, catching, holding, and releasing the feeding around the wheel or blank whilst the gears or cogs are being formed thereon.

To enable others skilled in the art to make and use my invention, I will proceed to describe the same with reference to the drawings.

Figure 1:
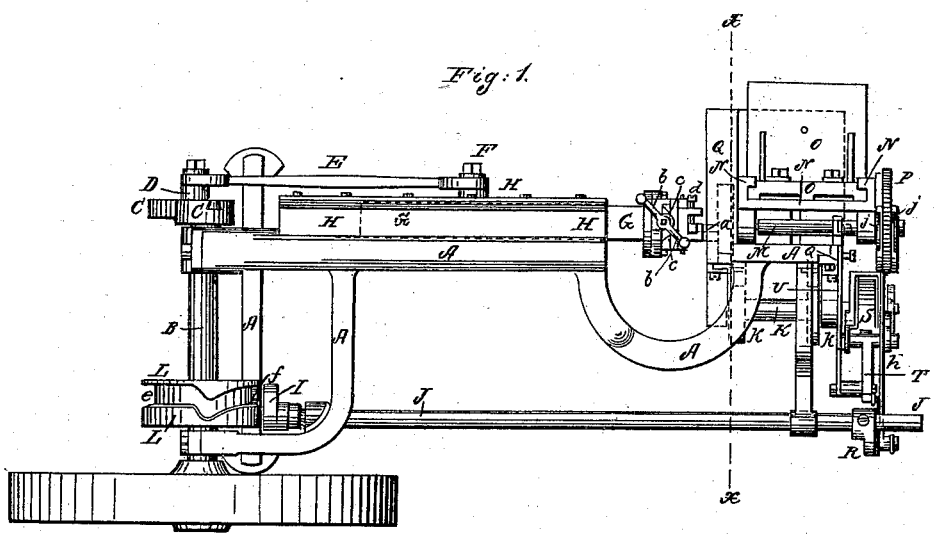
Figure 1 represents a top plan of the lathe or engine.

A represents a substantial frame for holding the operative parts of the lathe or engine. At one end of this frame there is a driving-shaft, B, which may receive its motion from any first-moving power, by means of crank, belt, or other appliance. The shaft B has upon one of its ends a slotted arm, C, in which a crank-wrist, D, is held, and adjusted to or from the centre of the shaft so as to have less or more sweep, as may be required. To this crank-wrist D, one end of a connecting-rod, E, is attached, the other end of said rod being attached to a stud, F, projecting from a sliding tool-holder, G, that moves in guides or ways H, and in or to this tool-holder G the cutting-tool $a$ is attached, so as to be readily set, held, adjusted, or removed, or replaced by the usual appliances used for such purposes, and as seen in fig. 1 at $b\ c\ d$, and through this shaft, crank-wrist, and connecting-rod, the cutter $a$ receives its reciprocating movement for cutting away the spaces between the gears or cogs of the internal gear-wheel, as will be presently described.

Upon the shaft B there is also arranged a wheel, L, which has a cam-groove or slot, $e$, cut in its perimeter, in which a friction-roll, $f$, runs or works, said friction-roll being upon a stud in the end of a crank-arm, I, that is placed upon the end of a shaft, J, and by which means said shaft J receives a rocking or oscillating motion in its bearings. The feed-motion of the lathe or engine is derived and transmitted through this shaft, and the crank-arm I upon one of its ends, and the crank K upon its opposite end, must be accurately arranged, adjusted, and held, that the feed-motion and cutting-tool may be accurately timed, and the wrist-pin $g$ of the crank K may be made adjustable so as to regulate the extent of the feed, or vary or change it for gears of varied sizes.

The gear to be cut is placed upon the end of a shaft, M, (said gear being shown by red lines in figs. 1 and 2,) which is hung upon an adjustable face-plate, N, said face-plate being upon a slide-rest, O, and which slide-rest has also a vertical motion imparted to it, as will be explained.

To the crank-wrist $g$ is attached a connecting-bar, $h$, the other end of which is pivoted to a pawl, $i$, which is suspended to the shaft M by straps $j$, and which shaft has also upon it a ratchet-wheel, P, that a dog or pawl takes into and turns, as said pawl is vibrated by the action of the rod $h$, and its crank-connection, the intermittent rotation of the ratchet-wheel P being communicated to the shaft M, and through said shaft to the gear-wheel upon its end, that is being acted upon by the cutter $a$.

Thus far I have described how motion is given to the cutter $a$, and one of the motions, viz, the intermittent rotary motion of the gear that the cutter acts upon to space off the cogs. The more important, essential, and novel movement given to the feed-motions I shall now proceed to describe.

Figure 2:
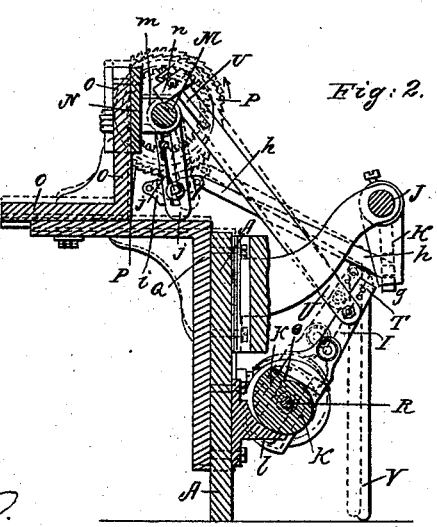
Figure 2 represents a vertical transverse section through the same, taken at the red line $x\ x$, of fig. 1, and showing by black and red lines the positions of the operative parts in commencing and completing the cutting of each space between the cogs.

A, in fig. 2, represents a portion of the main frame of the machine, and is immovable. Upon this fixed portion of the frame there is arranged a vertically sliding piece, Q, to which the rest O, the face-plate N, the shaft M, and its ratchet, pawl, and gear that is being operated upon, are all connected to or with, so that when the piece Q is moved up or dropped down, all these several connected parts move up and drop down with it. Upon this piece Q is hung a shaft, R, that carries two lifting-cams $k$ $k$, that work against bearings $l$, on the permanent part A of the frame, so that as the cams turn against these permanent bearings, the piece Q, with all its attached parts, will be also raised up, and which is accomplished as follows: Upon the shaft M, that carries the ratchet and the gear that is being cut, there is a small stud or projection, $m$, and upon the shaft R, that carries the raising-cams $k$, there is a friction-clutch, S, to an arm, T, of which a bar, U, is attached, the upper or free end of which bar has upon it a head, $n$, against which the stud or projection $m$ on the shaft M takes at every revolution of the said shaft, and carries said head and its bar U, and the friction-clutch S to which the bar U is connected, with it, until by its rotation the stud slips off from said head. The clutch S being thus moved turns the shaft R, and the lifting-cams upon it, and they in turn raise up the piece Q; and that all this vertical motion of the piece Q may be held and not lost, a brace, V, also connected with the arm T of the clutch, follows the movement of the clutch, and holds after the friction of the clutch is released, or goes back to prepare for the next similar lifting motion on the next revolution of the shaft M, and so on. When the cams $k$ have raised up the part Q to its defined height, their recess or brake $o$ comes to and slips over or off from the bearings $l$, and there being then nothing to hold up the part Q, it drops until the small diameter of the cams strike the bearings $l$, when it stops, and is again ready to be raised up, and held up and dropped down by the continued operation of the lathe as above described.

The ratchet P and its dog or pawl rotate and space off the gears or cogs to be cut, and the reciprocating cutter $a$ planes or cuts off a portion of the metal between the cogs, as the wheel is thus intermittently rotated. But this, though important as a part of the operation, would never of itself complete an internal gear-wheel, for unless it had other feed-motions, after one shaving was taken off, the cutter would not on the second rotation reach the metal at all; hence the vertical feed-motion through the appliances hereinabove described. Every revolution of the gear-wheel raises it up to an extent equal to the thickness of the shaving or chip taken off by the cutter $a$, so that every rotation brings up new metal for the cutter to act upon, until the necessary amount is planed or cut out to leave the cogs with sufficient prominence for the use they are designed for. The two feed-motions therefore are necessary to the production of an internal gear-wheel, viz, an intermittent rotary feed-motion, and in conjunction with it a vertical feed-motion.

Figure 3:
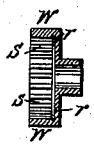
Figure 3 represents a section through one of the gears cut by the lathe or engine.

The wheel or blank W (fig. 3) is cast with a groove or recess, $r$, behind where the cogs $s$ are to be cut, so that the tool $a$ may pass through and beyond the cogs, and thus have a clearance. Without this groove or recess, an internal gear-wheel could not be cut in a lathe or engine. With it, and with the compound feed-motion imparted to the wheel in the progress of its being cut, internal gears may be cut with great rapidity and accuracy. In casting the wheel the groove or recess is formed therein by a core, in a manner well known to moulders or founders.

I have not deemed it necessary to mention all the adjustments upon the machine. It is sufficient to say that it is made for cutting gears of different sizes, and spaced cogs, as well as of different diameters or lengths of cogs.

It will be understood that the feeding takes place when the stud or projection $m$ on the shaft M is in contact with head or catch $n$ on the bar U; and that when the projection $m$ moves past or beyond the influence or contact with said head or catch $n$, the feed, for the time being, ceases.

Having thus fully described my invention, what I claim as new, and desire to secure by Letters Patent, is—

In a machine for cutting internal gears, in combination with the mechanism for producing the intermittent rotating feed motion given to the gear that is being cut, the mechanism for producing the vertical, or motion towards the cutting tool, substantially as herein described.

JOHN UNDERWOOD.

Witnesses:
  ALEX. BIERCE,
  DANIEL SAYLER.